United States Patent
Joshi et al.

(10) Patent No.: US 9,348,674 B2
(45) Date of Patent: May 24, 2016

(54) AYSNCHRONOUS COMMUNICATIONS HAVING COMPOUNDED RESPONSES

(71) Applicant: NetApp, Inc., Sunnyvale, CA (US)

(72) Inventors: Sandeep Joshi, Bangalore (IN); Ankit Mathur, Bangalore (IN); Sudip Kumar Panda, Bangalore (IN)

(73) Assignee: NetApp, Inc., Sunnyvale, CA (US)

( * ) Notice: Subject to any disclaimer, the term of this patent is extended or adjusted under 35 U.S.C. 154(b) by 20 days.

(21) Appl. No.: 14/341,592

(22) Filed: Jul. 25, 2014

(65) Prior Publication Data

US 2016/0026513 A1  Jan. 28, 2016

(51) Int. Cl.
| | | |
|---|---|---|
| G06F 3/00 | (2006.01) |
| G06F 9/44 | (2006.01) |
| G06F 9/46 | (2006.01) |
| G06F 13/00 | (2006.01) |
| G06F 9/54 | (2006.01) |

(52) U.S. Cl.
CPC ..................................... *G06F 9/545* (2013.01)

(58) Field of Classification Search
None
See application file for complete search history.

(56) References Cited

U.S. PATENT DOCUMENTS

| | | | |
|---|---|---|---|
| 2006/0212524 A1* | 9/2006 | Wu | H04L 67/10 709/206 |
| 2007/0115821 A1 | 5/2007 | Sim et al. | |
| 2007/0171919 A1 | 7/2007 | Godman et al. | |
| 2008/0184224 A1* | 7/2008 | Das | G06F 9/5077 718/1 |

OTHER PUBLICATIONS

International Search Report and Written Opinion, PCT Application No. PCT/US2015/042181, Oct. 19, 2015.

* cited by examiner

*Primary Examiner* — Craig Dorais
(74) *Attorney, Agent, or Firm* — Kilpatrick Townsend Stockton LLP

(57) ABSTRACT

A first request to execute a first task is received from a first module in a first address space and by a second module in a second address space. The first task is placed into a task queue for execution in the second address space. Pending responses not yet returned to the first module that are results of execution for other tasks in the second address space are extracted by the second module from a response queue. Requests for the other tasks were previously sent by the first module to the second module for execution in the second address space. The pending responses are compounded. The pending responses and a return value for acknowledgement the first request to execute the first task are combined, by the second module into a combined communication. The combined communication is transmitted by the second module to the first module in the first address space.

20 Claims, 6 Drawing Sheets

Compounded Response 500

| | Request ID | Response Code |
|---|---|---|
| Response 504 | Request ID | Response Code |
| Response 506 | Request ID | Response Code |
| Response 508 | Request ID | Response Code |
| Response 510 | Request ID | Response Code |
| Response 512 | Request ID | Response Code |

FIG. 5

AYSNCHRONOUS COMMUNICATIONS HAVING COMPOUNDED RESPONSES

BACKGROUND

Features generally relate to the field of computers, and, more particularly, to asynchronous communications having compounded responses.

Remote Procedure Call (RPC) is an inter-process communication that enables a procedure to execute in a different address space. The different address space can be in a same or different computer. Also, the programmer of the procedure is not required to code the instructions for this remote interaction with the different address space. Therefore, the same code can essentially be written for the procedure executing locally or in the different address space.

Usage of RPC abstracts the programmer from network programming, network errors, different character encoding and word length of computers in a network. RPC also allows running a specialized task (as a service) on a computer such that the task can be used by other computers in the network.

RPC can be synchronous or asynchronous. For synchronous RPC, a remote procedure is called and the calling routine blocks until the remote procedure returns a result. In many scenarios, the remote procedure can be time consuming and this leads to the blocking of thread/system-resources by the caller (or client). To avoid this blocking, many applications create two separate channels for asynchronous RPC. One channel is for sending the requests, and other channel is for receiving the responses. Each procedure can be identified by a unique identification. RPC that receives the request queues the request for processing and sends an acknowledgement to the client. When the procedure has completed execution, a response is sent to caller with the unique request identification along with the response.

BRIEF DESCRIPTION OF THE DRAWINGS

The features of the disclosure may be better understood by referencing the accompanying drawings.

FIG. 5 depicts an example compounded response that is included with a response to a task request, according to some features.

DETAILED DESCRIPTION OF EXAMPLE ILLUSTRATIONS

Figure 1:
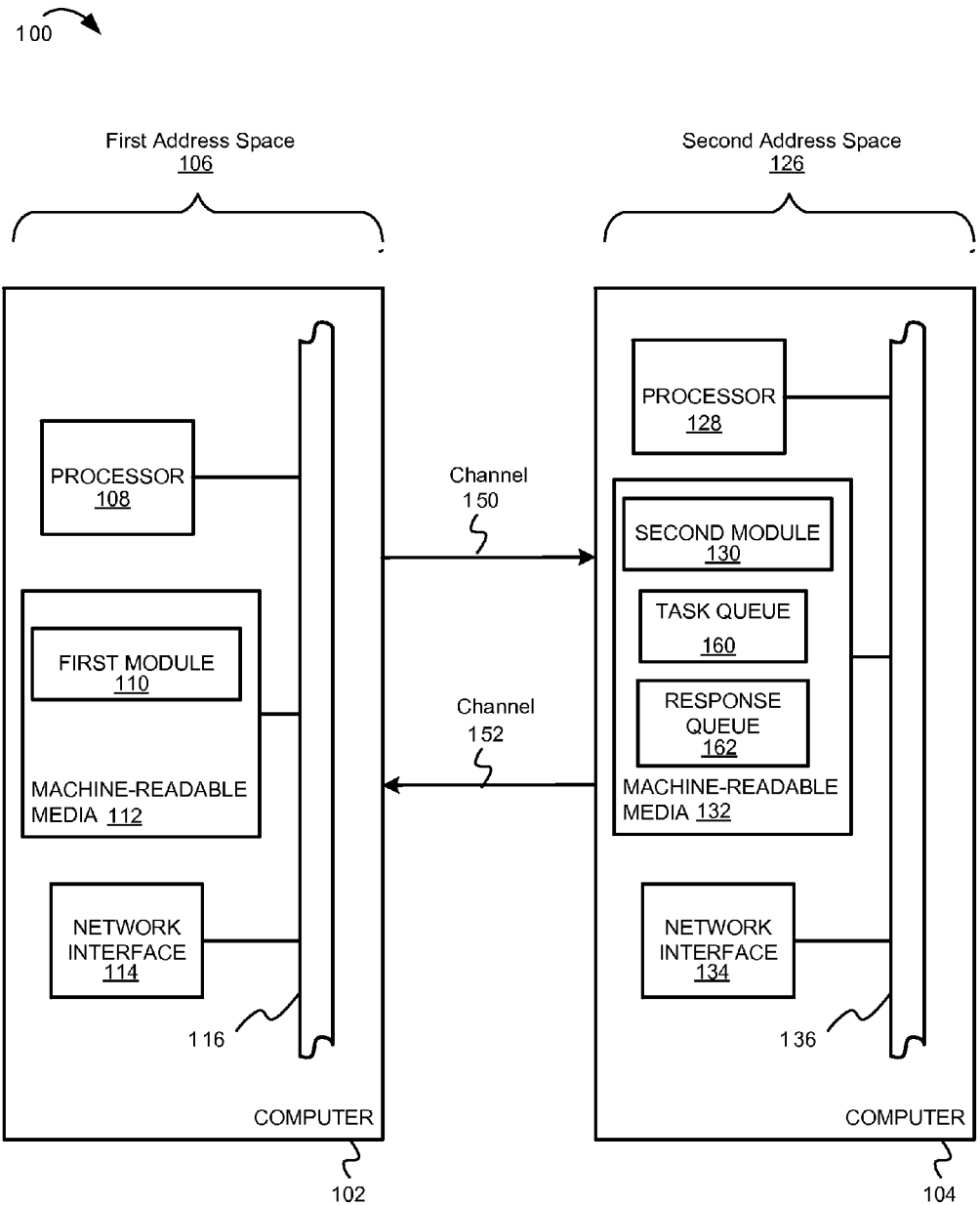
FIG. 1 depicts a system having asynchronous communications that includes compounded responses, according to some features.

The description that follows includes example systems, methods, techniques, instruction sequences and computer program products that that include techniques of the features described herein. However, it is understood that the described features may be practiced without these specific details. For instance, although examples refer to RPC communication, communication based on other types of protocols can incorporate the features described herein. In other instances, well-known instruction instances, protocols, structures and techniques have not been shown in detail in order not to obfuscate the description.

As described above, RPC communications can include a request and a response. A request from a first module (e.g., process) executing in a first address space can be sent to a second module (e.g., process) executing in a second address space. Also, receipt of the request can be acknowledged. The request can be for execution of a task by the second module. A task can be a function, subroutine, method or some other unit of code. After the task is complete, the second module can return a response. The responses are typically small. For example, the responses can include a request identification and a response code. In a number of situations, the responses to multiple requests can accumulate together in the second address space. The second module can be multi-threaded and executing on a separate server or computer. Accordingly, many of the requested tasks can get completed at or near the same time. Also, the requests and responses can be on two separate communication channels between the two address spaces. These two separate communication channels can communicate at differing speeds.

According to some features, responses in the second address space that have not yet been sent back to the first module that made the requests can be compounded together to create a compounded response. Also, this compounded response can piggyback onto a communication that includes an acknowledgement to a different request. In particular, the compounded response (that includes a number of responses) is combined with an acknowledgement for a request of a task that has not yet been completed. According to some features, the communications between the first address space and the second address space can be based on a communication protocol in an application layer of a multi-layered communication stack (e.g., RPC communications).

Therefore using some features described herein, there is no need to have a one-to-one relationship between an RPC request communication and an RPC response communication. In other words using some features described herein, there is no need to send a response for each request when pending responses for multiple requests are to be sent back to the first address space. Accordingly, these features can enable avoidance of the network latency for each request. Also, some features reduce the number of read/write context switches in the two address spaces, thereby improving performance of the system.

FIG. 1 depicts a system having asynchronous communications that includes compounded responses, according to some features. In FIG. 1, a system 100 includes a first address space 106 and a second address space 126. Each of the first address space 106 and the second address space 126 can include a range of addresses that are accessible by a process through an operating system. The addresses for an address space can be virtual or physical. Also, multiple address spaces can be within a same or different computer. In the example depicted by the system 100 illustrated in FIG. 1, the first address space 106 and the second address space 126 are in different computers. The first address space 106 is in a computer 102. The second address space 126 is in a computer 104.

The computer 102 includes a processor 108, machine-readable media 112, and a network interface 114 that are communicatively coupled together through a communication bus 116. The machine-readable media 112 can be volatile or non-volatile storage media. In this example, the machine-readable media 112 is configured to store a first module 110. The first module 110 can be software, hardware, firmware, or a combination thereof. For example, the first module 110 can be software executing on the processor 108. The network interface 114 can be software, hardware, firmware, or a combination thereof used for communication.

The computer 104 includes a processor 128, machine-readable media 132, and a network interface 134 that are communicatively coupled together through a communication bus 136. The machine-readable media 132 can be volatile or non-volatile storage media. In this example, the machine-readable media 132 is configured to store a second module 130, a task queue 160, and a response queue 162. The second module 130 can be software, hardware, firmware, or a combination thereof. For example, the second module 130 can be software executing on the processor 128. The network interface 134 can be software, hardware, firmware, or a combination thereof used for communication.

In the system 100, two channels of communication are created for communication between the computer 102 and the computer 104. A channel 150 is used for communication from the computer 102 to the computer 104. A channel 152 is used for communication from the computer 104 to the computer 102. According to some features, the computer 102 and the computer 104 can communication with each other using asynchronous RPC communications through the channel 150 and the channel 152. In this example as further described below, the first module 110 can transmit a request over the channel 150 to the computer 104. The request can be a request to perform execution of a task in the second address space 126. The second module 130 can receive the request and store the request in the task queue 160. Also in response to receiving the request, the second module 130 can transmit back an acknowledgement of receiving the request. Because the communications are asynchronous, the first module 110 can transmit additional requests for execution of tasks prior to receiving a response for the request. Also, after a task for a request has completed execution, the second module 130 can store the response (e.g., result) of the task in the response queue 162.

According to some features, responses in the response queue 162 in the second address space 126 that have not yet been sent back to the first module 110 in the first address space 106 can be compounded together to create a compounded response. Also, this compounded response can piggyback onto a communication that includes an acknowledgement to a different request. In particular, the compounded response (that includes a number of responses) can be combined with an acknowledgement for a request of a task that has not yet been completed. According to some features, this compounded response can piggyback onto a response to a different task request. Accordingly, multiple responses can be included with an acknowledgement to a task request not yet executed and/or with a different response after the task has been completed.

Figure 2:
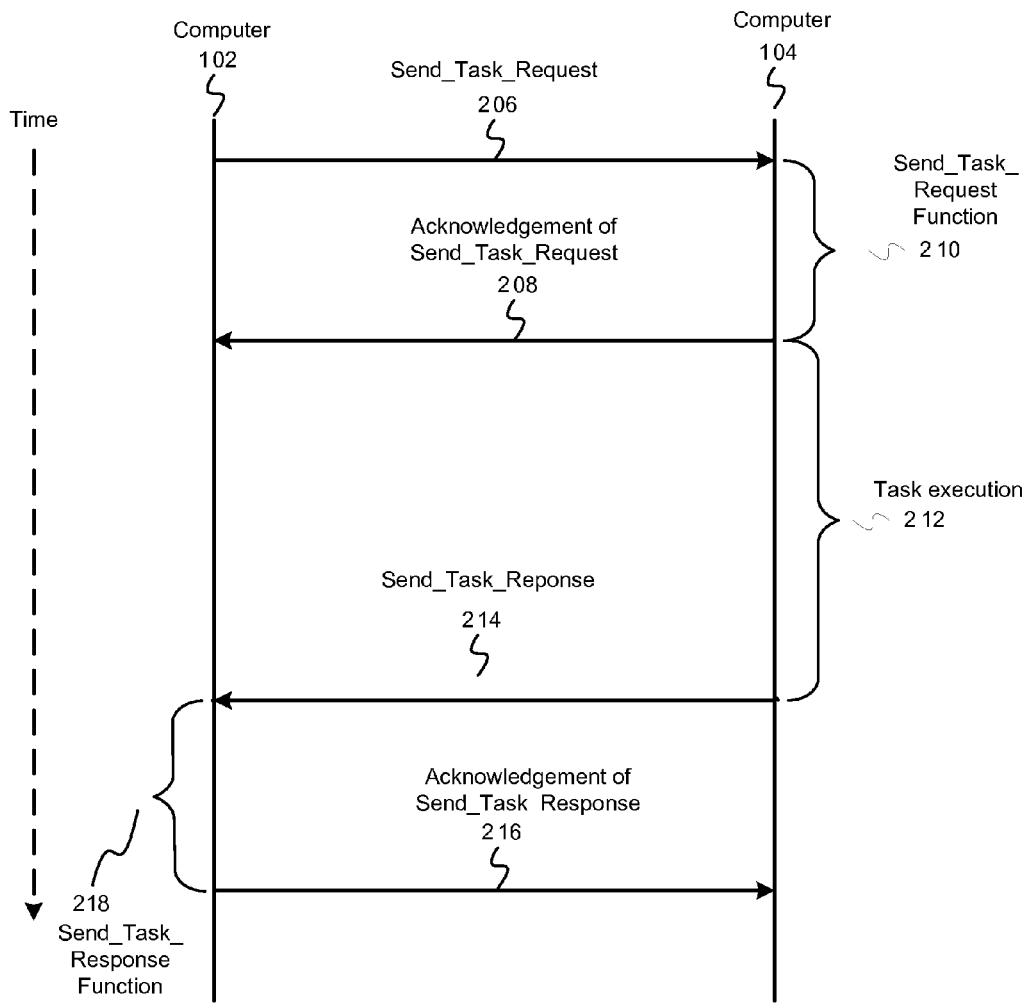
FIG. 2 depicts an exchange of asynchronous communications that includes compounded responses, according to some features.

To illustrate, FIG. 2 depicts an exchange of asynchronous communications that includes compounded responses, according to some features. FIG. 2 depicts example asynchronous communications between the computer 102 and the computer 104 depicted in FIG. 1. As described above, the computer 102 and the computer 104 are in different address spaces. In this example, the computer 102 includes a module or process (e.g., the first module 110 of FIG. 1) that is transmitting requests for execution of tasks in the address space that includes the computer 104. The computer 104 receives and processes the requests (as now described).

As shown, the computer 102 transmits a send_task_request 206 to the computer 104. With reference to FIG. 1, the first module 110 transmits the send_task_request 206 over the channel 150 to the computer 104.

Figure 3:
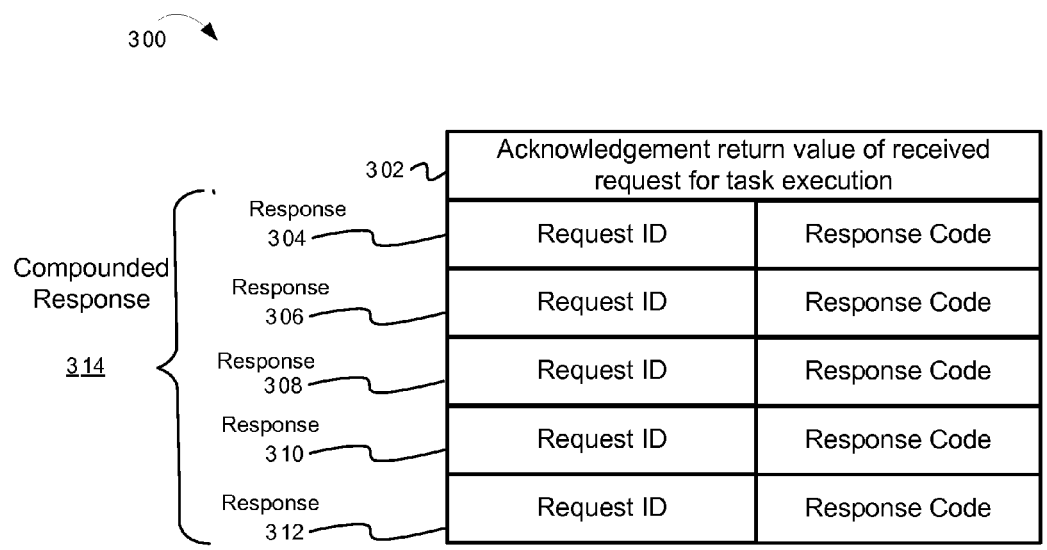
FIG. 3 depicts an example compounded response that is included with an acknowledgement to a task request, according to some features.

After receiving the send_task_request 206, the computer 104 executes a send_task_request function 210. With reference to FIG. 1, the second module 130 executes the send_task_request function 210. Execution of the send_task_request function 210 can cause the computer 104 to transmit an acknowledgement (an acknowledgement of send_task_request 208) back to the computer 102. With reference to FIG. 1, the second module 130 transmits the send_task_request function 210. In this example, the acknowledgement is the acknowledgement of a send_task_request 208. The return value can be an alphanumeric value that uniquely identifies this task request (the send_task_request 206) relative to other tasks received by the computer 104. One or more responses that are in the response queue 162 in the second address space 126 that have not yet been sent back to the first module 110 in the first address space can be compounded together to create a compounded response. The second module 130 can include this compounded response with the acknowledgement. Thus, the acknowledgement of the send_task_request 206 can include the acknowledgement along with a compounded response. An example of the acknowledgement along with a compounded response is depicted in FIG. 3, which is described in more detail below.

Execution of the send_task_request function 210 can also cause the computer 104 to initiate execution of a task that is being requested by the send_task_request 206—task execution 212. With reference to FIG. 1, the second module 130 can initiate another process in the computer 104 to perform the task. The task can any type of operation that occurs in the address space 126. For example, the task can include moving data, creating new data, deleting data, performing an Input/Output (I/O) operation, etc. Although not shown in FIG. 2, execution of the send_task_request function 210 can also cause the computer 104 to store the task into the task queue 160.

After the task execution 212 is complete, the computer 104 transmits a send_task_response 214 back to the computer 102. With reference to FIG. 1, the second module 130 can transmit the send_task_response 214 back to the computer 102. One or more other responses that are in the response queue 162 in the second address space 126 that have not yet been sent back to the first module 110 in the first address space can be compounded together to create a compounded response. Thus, the first module 110 can execute the send_task_response 214 to extract responses from the response queue 162 and compound them together. An example of the response along with a compounded response is depicted in FIG. 5, which is described in more detail below.

After receiving the send_task_response 214, the computer 102 executes a send_task_response function 218. With reference to FIG. 1, the first module 110 can execute the send_task_response function 218. Execution of the send_task_response 218 can cause the first module 110 to transmit an acknowledgement (an acknowledgement 216 of send_task_response 214) back to the computer 104. Execution of the send_task_response function 218 can also cause the first module 110 to initiate one or more other processes in the first address space 106. For example, one or more other processes can perform operation in response to completion of the tasks in the second address space 126 that are identified by the one or more responses that are included in the send_task_response 214. FIG. 2 depicts communications between the first address space 106 and the second address space 126 for one task request/response. These communications can occur for multiple task requests/responses.

FIG. 3 depicts an example compounded response that can be included with an acknowledgement to a task request, according to some features. FIG. 3 depicts an acknowledgement communication 300 that includes an acknowledgement to receiving a task request. The acknowledgement communication 300 can be an example of the acknowledgement of send_task_request 208 depicted in FIG. 2. As shown, the acknowledgement communication 300 includes an acknowledgement return value for acknowledgement of a received request for task execution 302 (the acknowledgement return value 302). According to some features, in addition to the acknowledgement return value 302, responses to completed tasks can be piggybacked onto the acknowledgement communication 300.

In this example, the acknowledgement communication 300 includes a compounded response 314. The compounded response 314 can include one or more responses (for tasks that have completed execution) that have not yet been sent back to the first address space to notify the first module in the first address space that task(s) have been completed in the second address space. For example with reference to FIG. 1, the second module 130 can retrieve one, some, or all of the responses residing in the response queue 162. The second module 130 can combine these responses to form the compounded response 314. In this example, the compounded response 314 includes five responses—a response 304, a response 306, a response 308, a response 310, and a response 312. As shown, each of the response 304, the response 306, the response 308, the response 310, and the response 312 include a request ID and a response code. The request ID includes an identification of the request that was transmitted to the second address space to initiate execution of a task. Thus, the response that is returned to the first address space can be associated with the request that causes execution of a task that created this response. The response code can include a value that includes a result of execution of the task. For example, one value of a response code can notify that the task was successfully executed. In another example, another value of a response code can notify that the task was not successfully executed. In another example, another value of a response code can be some data returned as a result of execution of the task.

Figure 4:
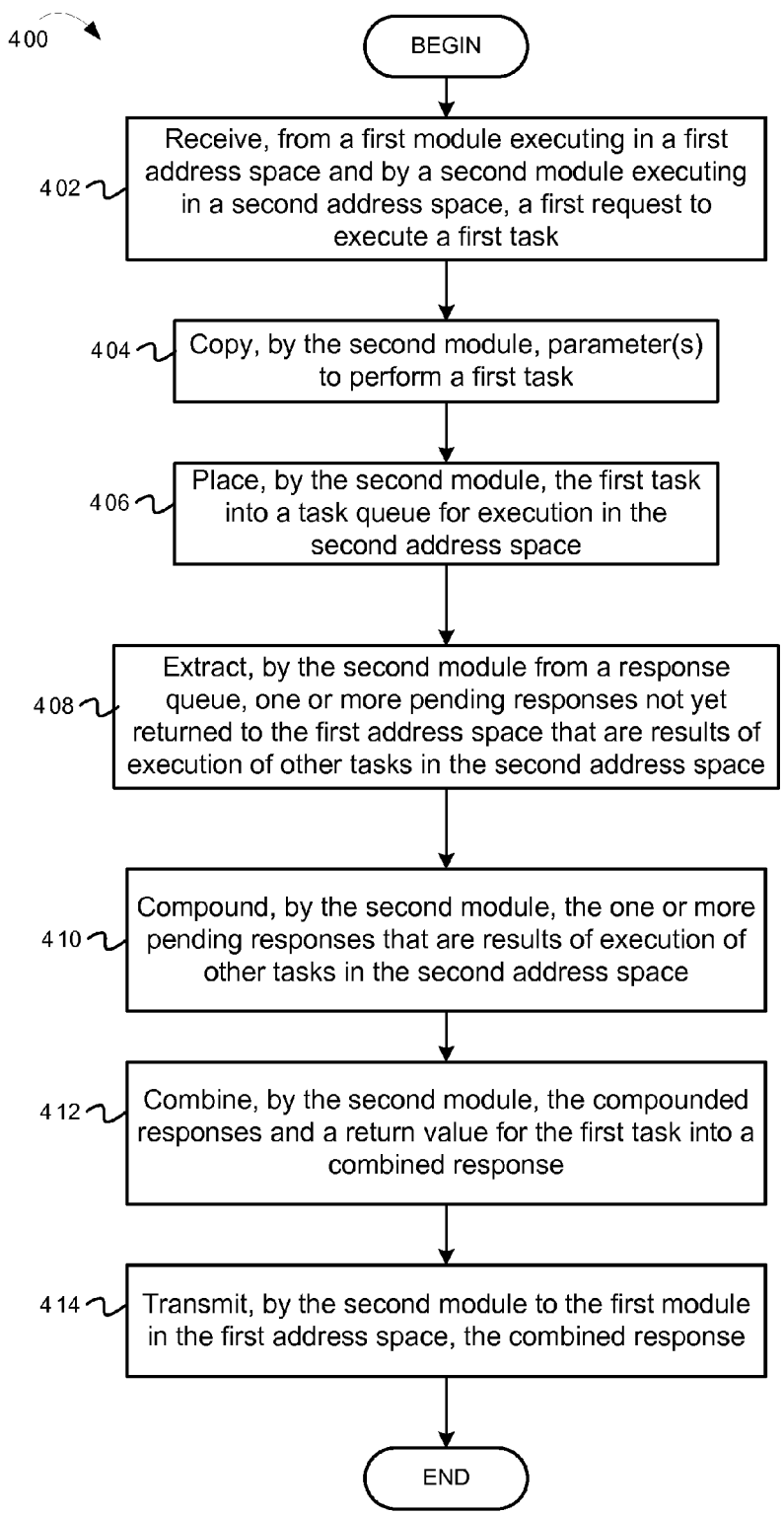
FIG. 4 depicts a flowchart of operations performed by a task server that includes compounded responses included with an acknowledgment to a task request, according to some features.

To further illustrate, FIG. 4 depicts a flowchart of operations performed by a task server that includes compounded responses included with an acknowledgment to a task request, according to some features. FIG. 4 depicts a flowchart 400. The operations depicted in the flowchart 400 are described in reference to FIGS. 1-3. Operations of the flowchart 400 start at block 402.

At block 402, a first request to execute a first task is received from a first module executing in a first address space and by a second module executing in a second address space. With reference to FIG. 1, the second module 130 executing in the second address space 126 can receive a first request to execute a first task from the first module 110 in the first address space 106 over the channel 150. With reference to FIG. 2, the first request can be the send_task_request 206. Operations of the flowchart 400 continue at block 404.

At block 404, parameter(s) to perform the first task are copied from the first request by the second module. With reference to FIG. 1, the second module 130 can copy the parameters to perform the first task. For example, the first request can be a function that includes one or more parameters. Below is example pseudocode for the first request:

```
SendReqReturnVal_t send_task_request (int cookie, parameter1, parameter2, ...)
{
    Copy the parameters to perform the task.
    Place the task into task queue.
    Extract response(s).
    Compound the response(s).
    Combine the return value and the compounded response(s).
    Return compounded response(s) and along with the return value.
}
```

In this example pseudocode for the first task request, two parameters are passed with the function—parameter1 and parameter2. As shown in the first line of the pseudocode above, execution of the function send_task_request causes the parameters to perform the first task to be copied. The second module 130 can copy the parameter(s) for the first task request into machine-readable media in the second address space 126. The pseudocode shown above for the function send_task_request can also pass a "cookie" into the second address space 126. The "cookie" can be a value that uniquely identifies the task request sent by the computer 102. The use of the "cookie" is further described below. Operations of the flowchart 400 continue at block 406.

At block 406, the first task is placed into a task queue for execution in the second address space by the second module. With reference to FIG. 1, the second module 130 can place the first task (identified by the first task request) into the task queue 160 in the second address space 126. Accordingly, tasks can be removed from the task queue 160 for execution according to an order that the tasks are placed into the task queue 160. With reference to the pseudocode above for the send_task_request, this operation is depicted by the second line of code. Operations of the flowchart 400 continue at block 408.

At block 408, one or more pending responses not yet returned to the first address space are extracted from the response queue by the second module. With reference to FIG. 1, the second module 130 can extract one or more pending responses from the response queue 162. For example, the second module 130 can retrieve one, some, or all of the responses residing in the response queue 162. A pending response can be stored in the response queue 162 after the associated task has completed execution in the second address space 126. Operations of the flowchart 400 continue at block 410.

At block 410, the one or more pending responses that are results of execution of other tasks in the second address space are compounded together by the second module. With reference to FIG. 1, the second module 130 can compound the one or more pending responses together. With reference to FIG. 3, an example of the compounded responses is depicted by the compounded response 314, which includes five responses. Operations of the flowchart 400 continue at block 412.

At block 412, the compounded response and a return value for the first task is combined into a combined response. With reference to FIG. 1, the second module 130 can combine the compounded responses with the return value. Returning to the pseudocode above for send_task_request, a new data type (new typedef) has been defined SendReqReturnVal:

```
typedef struct cookieResp {
    int cookie;
    int response;
}cookieResp_t;
typedef struct SendReqReturnVal {
```

```
        int retVal;
        list<cookieResp> compoundedResp
    } SendReqReturnVal_t;
    SendReqReturnVal_t send_task_request (int cookie, parameter1,
    parameter2);
```

Because of the inclusion of the compounded responses with the return value for the acknowledgement of a task request, a new data type for the send_task_request has been defined. In particular, a new data type has been defined—SendReqReturnVal_t, which defines a new type definition for what is returned as the response for execution of send_task_request. As shown by the new data type defined above, the data type SendReqReturnVal_t returns a return value (retVal) that is the acknowledgement return value and a compounded response (compoundedResp) which includes a list of one or more responses. Thus, instead of the return value being an integer value as a response to execution of the send_task_request, a new data type has been defined to return the return value and a compounded response with one or more responses that are a result of completion of execution of other tasks in the second address space (which have not yet been returned to the first address space). Operations of the flowchart 400 continue at block 414.

At block 414, the combined response is transmitted by the second module to the first module in the first address space. With reference to FIG. 1, the second module 130 can transmit the combined response back to the first address space 106 through the channel 152. Operations of the flowchart 400 are complete.

In addition to sending back combined responses with an acknowledgement, some feature can send back combined responses with a response that is queued to be sent back to the first address space. To illustrate, FIG. 5 depicts an example compounded response that is included with a response to a task request, according to some features. FIG. 5 depicts a compounded response 500. The compounded response 500 can be an example of the send_task_response 214 depicted in FIG. 2. With reference to FIG. 1, the compounded response 500 can include one, some or all of the pending responses in the response queue 162 that have not yet been returned to the first address space 106.

In this example, the compounded response 500 includes five responses that have not yet been returned to the first address space 106. Accordingly, instead of returning one response for each communication from the second address space 126 to the first address space 106, according to some features multiple responses can be combined as a communication. The compounded response 500 includes a response 504, a response 506, a response 508, a response 510, and a response 512. Assume that the response 504 is at the top of the response queue 162. Conventional RPC operations typically would just return the response 504. However, some features combine other responses to be included with the response 504 that is returned to the first address space 106. In this example, four additional responses are included in the compounded response 500 that are returned—the response 506, the response 508, the response 510, and the response 512. For example, the response 506, the response 508, the response 510, and the response 512 can be the remaining responses in the response queue 162. In another example, the response 506, the response 508, the response 510, and the response 512 can be the next four responses in the response queue 162 to be returned, thereby leaving some responses in the response queue 162.

As shown, each of the response 504, the response 506, the response 508, the response 510, and the response 512 include a request ID and a response code. As described above, the request ID includes an identification of the request that was transmitted to the second address space to initiate execution of a task. Thus, the response that is returned to the first address space can be associated with the request that causes execution of a task that created this response. The response code can include a value that includes a result of execution of the task. For example, one value of a response code can notify that the task was successfully executed. In another example, another value of a response code can notify that the task was not successfully executed. In another example, another value of a response code can be some data returned as a result of execution of the task.

Figure 6:
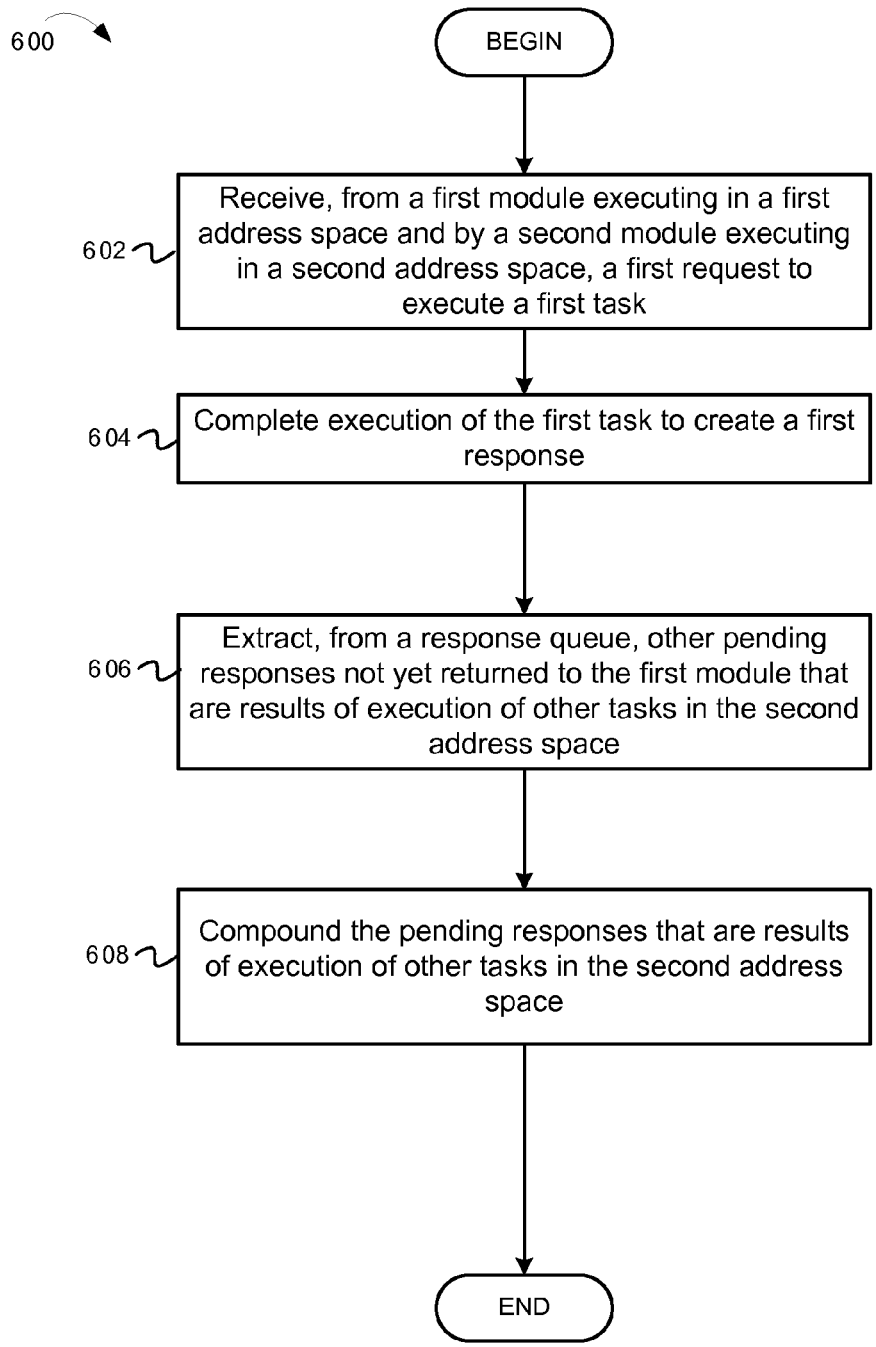
FIG. 6 depicts a flowchart of operations performed by a task server that includes compounded responses included with a response to a task request, according to some features.

To further illustrate, FIG. 6 depicts a flowchart of operations performed by a task server that includes compounded responses included with a response to a task request, according to some features. FIG. 6 depicts a flowchart 600. The operations depicted in the flowchart 600 are described in reference to FIGS. 1-2 and 5. Operations of the flowchart 600 start at block 602.

At block 602, a first request to execute a first task is received from a first module executing in a first address space and by a second module executing in a second address space. With reference to FIG. 1, the second module 130 executing in the second address space 126 can receive a first request to execute a first task from the first module 110 in the first address space 106 over the channel 150. With reference to FIG. 2, the first request can be the send_task_request 206. Operations of the flowchart 600 continue at block 604.

At block 604, execution of the first task is completed to create a first response. With reference to FIG. 1, the second module 130 or some other module can execute the first task. For example with reference to FIG. 1, the second module 130 can initiate another module in the computer 104 to perform the task. The task can be any type of operation that occurs in the address space 126. For example, the task can include moving data, creating new data, deleting data, performing an Input/Output (I/O) operation, etc. After execution of the first task is completed, operations of the flowchart 600 continue at block 606.

At block 606, one or more pending responses not yet returned to the first address space are extracted from the response queue. With reference to FIG. 2, the computer 104 can execute a send_task_response 214 in the second address space. With reference to FIG. 1, the second module 130 can execute the send_task_response 214. Below is example pseudocode for the send_task_response 214:

```
    int send_task_response(list<cookieResp_t>)
    {
        Remove responses from response queue
        Compound responses together
        Return Success/Failure.
    }
    typedef struct cookieResp {
        int cookie;
        int response;
    }cookieResp_t;
    int send_task_response(list<cookieResp_t>);
```

As shown by the first two lines of pseudocode of send_task_response provided above, one or more other responses that are in the response queue 162 in the second address space 126 that have not yet been sent back to the first module 110 in the first address space can be extracted from the response queue 162 and compounded together to create a compounded response. Thus, the second module 130 can remove the responses from the response queue 162. Operations of the flowchart 600 continue at block 608.

At block 608, the one or more pending responses that are results of execution of other tasks in the second address space are compounded together by the second module. As described above with reference to FIGS. 1-2, the second module 130 can compound the one or more pending responses together based on execution of the send_task_response. Execution of the send_task_response 218 can also cause the first module 110 to initiate one or more other processes in the first address space 106. For example, one or more other processes can perform operation in response to completion of the tasks in the second address space 126 that are identified by the one or more responses that are included in the send_task_response 218. Operations of the flowchart 600 are complete.

As will be appreciated by one skilled in the art, some features may be a system, method or computer program product. Accordingly, some features may be entirely hardware, entirely software (including firmware, resident software, micro-code, etc.) or some combination of software and hardware that may all generally be referred to herein as a "circuit," "module" or "system." Furthermore, some features may take the form of a computer program product in one or more computer readable medium(s) having computer readable program code included thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code included therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code included on a computer readable medium may be transmitted using any appropriate medium, including but not limited to wireless, wireline, optical fiber cable, RF, etc., or any suitable combination of the foregoing.

Computer program code for carrying out operations for some features may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Some features are described with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While features are described with reference to various implementations and exploitations, it will be understood that these features are illustrative and that the scope of the features is not limited to them. In general, techniques for asynchronous communications having compounded responses as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the features described herein. In general, structures and functionality presented as separate components in the exemplary configurations may be implemented as a combined structure or component. Similarly, structures and functionality presented as a single component may be implemented as separate components. These and other variations, modifications, additions, and improvements may fall within the features described herein.

What is claimed is:

1. A method comprising:
    receiving, from a first module executing in a first address space and by a second module in a second address space through a channel, a request to execute a task, wherein the request is part of a function that is to be executed in the second address space;
    placing, by the second module, the task into a task queue for execution in the second address space;
    extracting, by the second module from a response queue, pending responses not yet returned to the first module that are results of execution of other tasks in the second address space, wherein requests for the other tasks were previously sent from the first module to the second module for execution in the second address space;
    compounding, by the second module, the pending responses that are the results of execution of the other tasks in the second address space to form a compounded response;
    combining, by the second module, the compounded response and a return value for acknowledgement of the request to execute the task into a combined communication,
        wherein the combined communication is formatted according to a new data type that is defined to include the acknowledgement and a list of the pending responses,
        wherein a return value of the function is defined as the new data type; and
    transmitting, by the second module to the first module in the first address space, the combined communication.

2. The method of claim 1, further comprising:
    copying, by the second module, at least one parameter to perform the task, after receiving the request to execute the task.

3. The method of claim 1, wherein transmitting the combined communication occurs prior to completion of the task.

4. The method of claim 1, wherein the combined communication is transmitted through an additional channel.

5. The method of claim 1, further comprising completing, by the second module, execution of the task.

6. The method of claim 5, further comprising:
    extracting from the response queue other pending responses that are results of execution of additional other tasks in the second address space; and
    compounding the other pending responses and an response for the task.

7. The method of claim 1, wherein the request and the combined communication are based on a communication protocol in an application layer of a multi-layered communication protocol stack.

8. A non-transitory machine readable medium having stored thereon instructions for performing a method, the instructions comprising machine-executable code that, when executed by at least one machine, causes the at least one machine to:
    receive, from a first module executing in a first address space and by a second module in a second address space through a channel, a request to execute a task, wherein the request is part of a function that is to be executed in the second address space;
    place, by the second module, the task into a task queue for execution in the second address space;
    extract, by the second module from a response queue, pending responses not yet returned to the first module that are results of execution of other tasks in the second address space, wherein requests for the other tasks were previously sent by the first module to the second module for execution in the second address space;
    compound, by the second module, the pending responses that are the results of execution of the other tasks in the second address space to form a compounded response;
    combine, by the second module, the compounded response and a return value for acknowledgement of the request to execute the task into a combined communication,
        wherein the combined communication is formatted according to a new data type that is defined to include the acknowledgement and a list of the pending responses,
        wherein a return value of the function is defined as the new data type; and
    transmit, by the second module to the first module in the first address space, the combined communication.

9. The non-transitory machine readable medium of claim 8, wherein the machine-executable code, when executed by the at least one machine, further causes the at least one machine to:
    copy, by the second module, at least one parameter to perform the task, after receiving the request to execute the task.

10. The non-transitory machine readable medium of claim 8, wherein the machine-executable code, when executed by the at least one machine, causes the at least one machine to transmit the combined communication prior to completion of the task.

11. The non-transitory machine readable medium of claim 8, wherein the machine-executable code, when executed by the at least one machine, causes the at least one machine to transmit the combined communication through an additional channel.

12. The non-transitory machine readable medium of claim 8, wherein the machine-executable code, when executed by the at least one machine, also causes the at least one machine to:
    complete, by the second module, execution of the task.

13. The non-transitory machine readable medium of claim 12, wherein the machine-executable code, when executed by the at least one machine, also causes the at least one machine to:
    extract from the response queue other pending responses that are results of execution of additional other tasks in the second address space; and
    compound the other pending responses and a response for the task.

14. The non-transitory machine readable medium of claim 8, wherein the request and the combined communication are based on a communication protocol in an application layer of a multi-layered communication protocol stack.

15. An apparatus comprising:
    a memory containing a non-transitory machine-readable medium that comprises machine-executable code having stored thereon instructions for performing a method; and
    a processor communicatively coupled to the memory, the processing machine configured to execute the machine-executable code to cause the processor to:
        receive, from a first module to execute in a first address space and by a second module in a second address space through a channel, a request to execute a task, wherein the request is part of a function that is to be executed in the second address space;
        place, by the second module, the task into a task queue for execution in the second address space;

extract, by the second module from a response queue, pending responses not yet returned to the first module that are results of execution of other tasks in the second address space, wherein requests for the other tasks were previously sent by the first module to the second module for execution in the second address space;

compound, by the second module, the pending responses that are the results of execution of the other tasks in the second address space to form a compounded response;

combine, by the second module, the compounded response and a return value for acknowledgement of the request to execute the task into a combined communication,
   wherein the combined communication is formatted according to a new data type that is defined to include the acknowledgement and a list of the pending responses,
   wherein a return value of the function is defined as the new data type; and transmit, by the second module to the first module in the first address space, the return value of the function after execution of the function.

16. The apparatus of claim 15, wherein the processor is further configured to copy at least one parameter to perform the task, after receipt of the request to execute the task.

17. The apparatus of claim 15, wherein the processor is further configured to cause the apparatuses to transmit the combined communication prior to completion of the task.

18. The apparatus of claim 15, wherein the processor is further configured to complete, by executing the second module, execution of the task.

19. The apparatus of claim 15, wherein the processor is further configured to:
   extract from the response queue other pending responses that are results of execution of additional other tasks in the second address space; and
   compound the other pending responses and an response for the task.

20. The apparatus of claim 15, wherein the request and the combined communication are based on a communication protocol in an application layer of a multi-layered communication protocol stack.

* * * * *